Dec. 30, 1924.
G. E. ERICSSON
MACHINE FOR SMOOTHING CURVED SURFACES
Original Filed Oct. 11, 1922   3 Sheets-Sheet 1
1,520,703
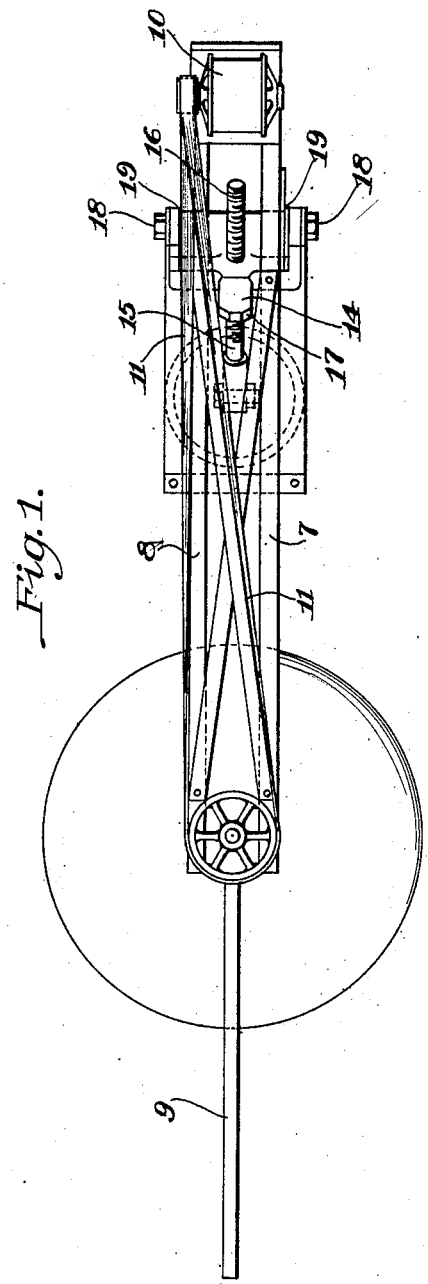
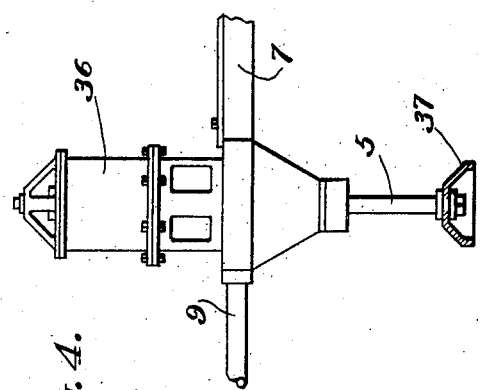
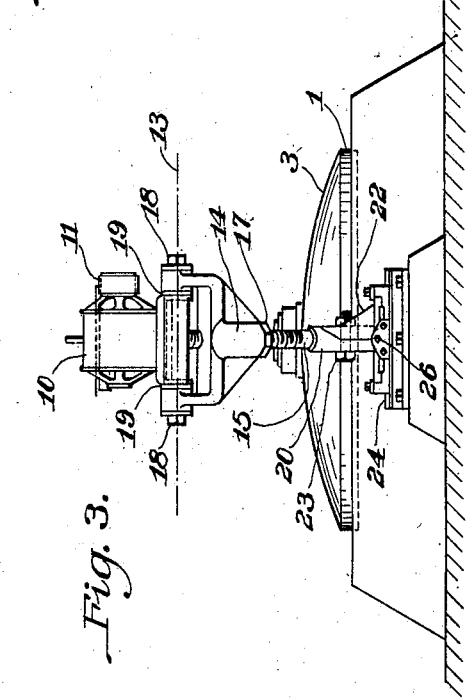
INVENTOR
Gustav E. Ericsson
by
James C. Bradley
attys Dec. 30, 1924.
G. E. ERICSSON
1,520,703
MACHINE FOR SMOOTHING CURVED SURFACES
Original Filed Oct. 11, 1922   3 Sheets-Sheet 2
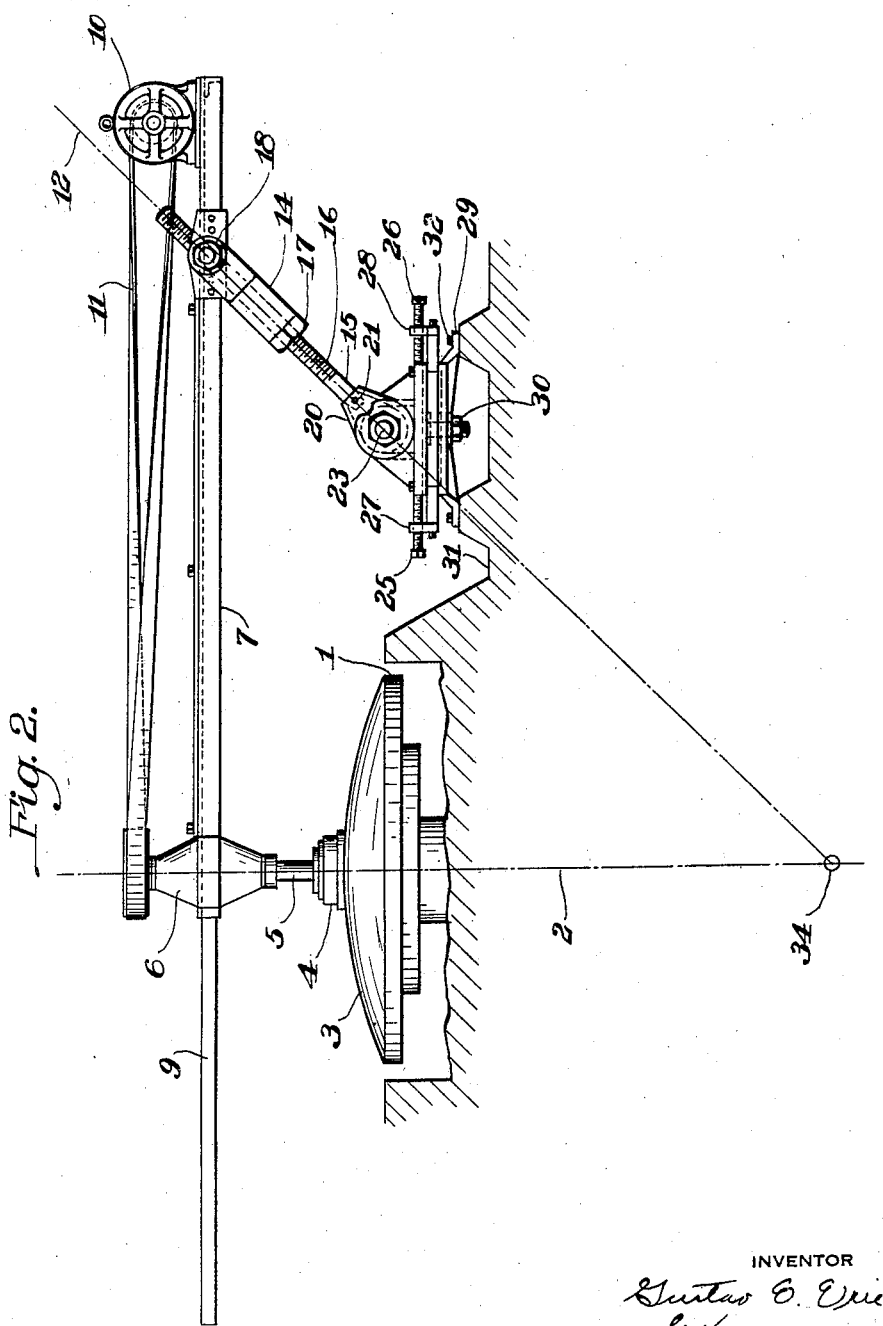
INVENTOR
Gustav E. Ericsson
by
James C. Bradley
atty.

Dec. 30, 1924.
G. E. ERICSSON
1,520,703
MACHINE FOR SMOOTHING CURVED SURFACES
Original Filed Oct. 11, 1922    3 Sheets-Sheet 3
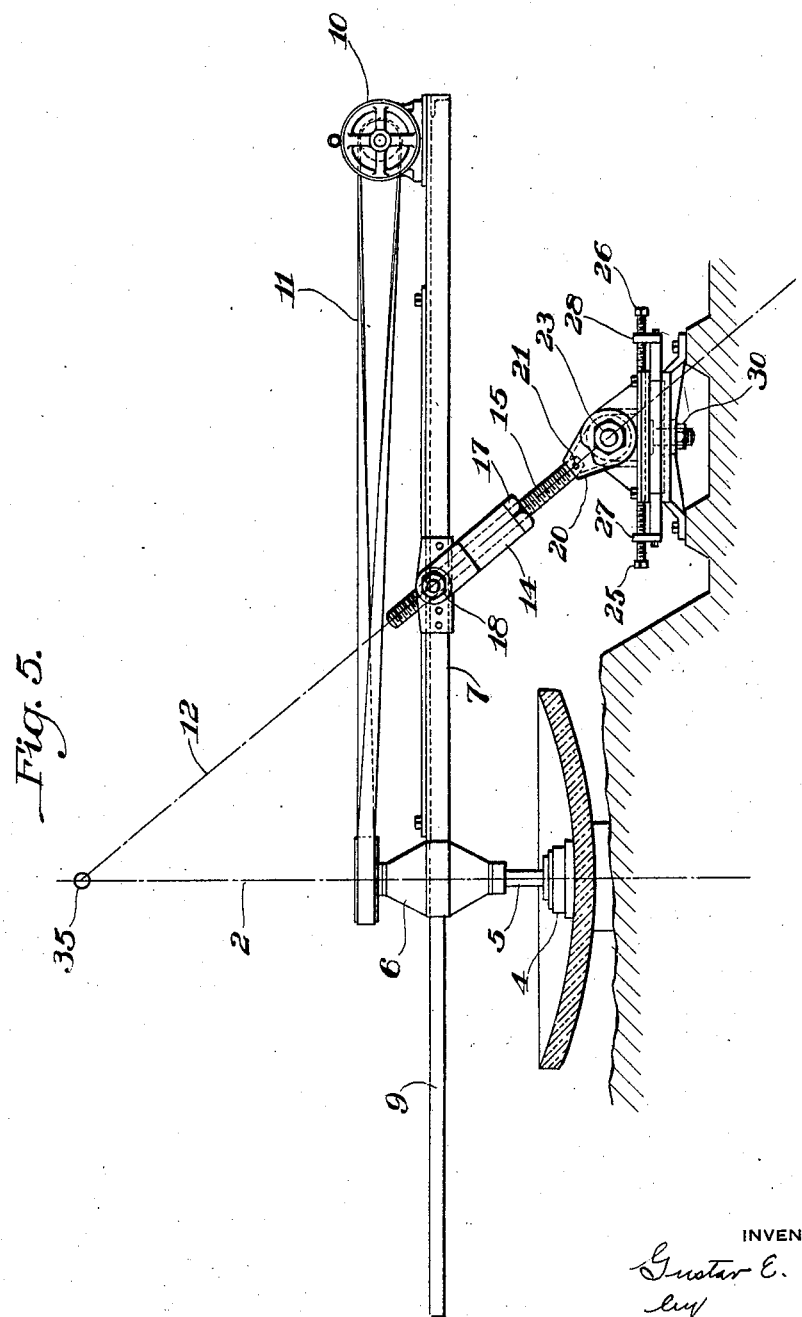
INVENTOR
Gustav E. Ericsson
by
James C. Bradley
atty Patented Dec. 30, 1924.

1,520,703

UNITED STATES PATENT OFFICE.

GUSTAV EDWARD ERICSSON, OF FORD CITY, PENNSYLVANIA, ASSIGNOR TO PITTSBURGH PLATE GLASS COMPANY, A CORPORATION OF PENNSYLVANIA.

MACHINE FOR SMOOTHING CURVED SURFACES.

Substitute for application Serial No. 593,762, filed October 11, 1922. This application filed August 23, 1924. Serial No. 733,711.

*To all whom it may concern:*

Be it known that I, GUSTAV EDWARD ERICSSON, a citizen of the United States, and a resident of Ford City, in the county of Armstrong and State of Pennsylvania, have made a new and useful invention in Improvements in a Machine for Smoothing Curved Surfaces, of which the following is a specification.

The invention relates to a machine for smoothing curved surfaces, such as the concave or convex parabolic surfaces of the large reflectors employed in search lights. It is particularly designed for polishing, for which work it is peculiarly adapted, but might be used for grinding the surfaces as well as polishing them, as hereinafter set forth. The invention has for its principal objects the provision of an improved machine, (1) in which the lap employed may be driven directly from the motor with a belt drive, (2) in which the spindle of the lap is always maintained substantially perpendicular to the surface of the glass regardless of the position of the lap on the glass, (3) in which the lap is guided in a path which closely approximates the curvature of the surface to be produced and (4) in which the mechanism employed is of a very simple character and readily manipulated by the operator without the requirement of any great degree of skill or experience. Certain embodiments of the invention are illustrated in the accompanying drawings in which:

Figure 1 is a plan view of the apparatus; Fig. 2 is a side elevation of the machine as applied to the smoothing of a convex surface; Fig. 3 is an end elevation of the apparatus of Fig. 2; Fig. 4 is a fragmentary view showing a modified drive arrangement in connection with a grinding disc and Fig. 5 is a side elevation of the apparatus of Fig. 2 modified in its adjustment so as to smooth the inner concave surface of the reflector blank of Fig. 2.

Referring to the drawings, 1 is a supporting table mounted for rotation about the axis 2 and driven by suitable means not shown, such table upon its upper face carrying the reflector blank 3, whose surface is to be polished by means of the lap 4. The lap 4 is preferably in the form of a pneumatic pad, distended by air pressure in order to make a continuous and uniform pressure with the surface of the glass, and during the application of this lap, rouge and water or other suitable polishing materials are employed.

The lap is mounted upon a spindle 5 carried by suitable bearings 6 upon a frame consisting of a pair of angle irons 7 and 8 secured together by suitable transverse angle bars. One end of this frame is provided with a handle in the form of the tube 9, while the other end carries the electric motor 10 which drives the spindle 5 by means of the belt 11 which engages suitable pulleys on the axle of the motor and on the upper end of the spindle.

The frame is mounted for lateral oscillation around the inclined axis 12 and also for vertical oscillation around the horizontal axis 13 (Fig. 3). These pivotal mountings are provided by means of the yoke 14 through which the inclined shaft 15 extends, such shaft being threaded as indicated at 16 and being provided with a nut 17 which provides for the adjustment of the yoke longitudinally of the shaft. A pair of stud bolts 18 (Fig. 3) project inwardly from the sides of the fork 14 and are pivotally engaged at their inner ends by the bearings 19 carried upon the outer sides of the angles 7 and 8 constituting the frame.

The support for the shaft 15 is provided by the casting 20 into which the end of the shaft 15 extends, as indicated in Fig. 2 and to which it is secured by means of the pin 21. This casting 20 is mounted for pivotal support upon a slide member 22, the parts being clamped in any desired position of adjustment by means of the bolt 23. The slide member 22 is itself mounted for horizontal adjustment toward and from the axis 2 of the table being slidably supported in the guide 24 and being held in any desired position of adjustment by means of the bolts 25 and 26. These bolts extend through bracket members 27 and 28 carried by the plate 24. The plate 24 rests upon a base plate 29 and is secured thereto by means of a clamping bolt 30. The plate 24 may be adjusted about the axis of the bolt 30 and when in adjusted position is clamped against further movement by means of the nut on the lower end of the bolt. The base plate 29 is secured rigidly to the concrete foundation 31 by means of the bolts 32.

The foregoing support for the shaft 15 thus provides for three different adjustments, the first being in an angular direction about bolt 23 as an axis, the second in a horizontal direction toward and from the axis of the table by means of the bolts 25, and the third being in a circular direction around the axis of the bolt 30. When in use these adjustments are all in tightened adjustment so that the shaft 15 is held rigidly in position at the desired angle of inclination. In use the parts carrying the shaft 15 are adjusted so that the axis 12 intercepts or cuts the axis of the table 2 at the point 34, the point 34 being located from the upper surface of the glass 3 a distance equal to the average radius of curvature of the upper surface of the glass 3, the term "average radius of curvature" being used because the blank being smoothed in this particular instance has the curvature of the parabola whose radius constantly varies. In the case of the smoothing of a surface which is spherical, the point 34 would lie at a distance from the surface being smoothed equal to the radius of curvature of the sphere. In case other blanks are smoothed in the machine having different curvatures than the blank 3, the necessary adjustments of the shaft 15 and its support would be made in order to make the distance from the point 34 to the surface being smoothed equal to the average radius of curvature of the blank.

In operation the handle 9 is moved from side to side carrying the lap 4 from the center of the glass to an extreme lateral position at which point it overhangs the edge of the glass being ground. During this movement the spindle is maintained at approximately right angles to the surface of glass regardless of the position of the lap, and the lap because of its flexibility adjusts itself to the surface of the glass and applies a substantially uniform pressure throughout its area of contact. The guided movement of the lap follows a path which is sufficiently near to the parabolic curvature of the glass so that, for all practical purposes, no damage is done by reason of the fact that the lap is not guided in a true parabolic path.

When the interior or concave surface of the blank is to be smoothed, it is reversed in position upon a table formed to engage the convex surface of the blank, thus leaving the concave surface uppermost and the inclined shaft 15 is adjusted to the position indicated, at which time its center line extended cuts the center line 2 of the table at the point 35 located above the table. The functions of the apparatus as thus adjusted are substantially the same as those heretofore described in connection with the apparatus positioned as indicated in Fig. 2, the spindle being maintained at substantially right angles to the concave surface of the glass, and the lap being swung back and forth by means of the handle 9 from the center of the glass to the edge thereof. Due to the weight of the parts, the tendency of the lap is to move by gravity from the high point on the blank to the low point, and in order to counteract this tendency and render the manipulations easier for the operator, the device may be counterweighted by attaching a rope or cable to the frame, preferably near the bearing member 6 and directed laterally over a pulley with a suitable weight attached thereto, such counterweight not being illustrated because of its obvious character and the common use of counterweights wherever necessary or desirable.

The apparatus may also be employed in operations other than polishing, such for instance as grinding in which case the modified arrangement illustrated in Fig. 4 is preferably employed. In this arrangement the spindle 5 is directly connected to the axle of the electric motor 36 mounted above the spindle upon the frame 7, and the spindle itself carries at its lower end the annular grinding wheel 37 adapted to engage and grind the surface of the glass. In this case an abrasive with water is used in connection with the grinding wheel. The surface as produced by grinding with this apparatus is, as heretofore indicated, not a true paraboloid but is sufficiently close for some purposes and might be employed to advantage in grinding concave surfaces of parabolic reflectors where the requirement for accuracy is not as great as upon the convex surface. It might also be possible to add correcting devices which would render the path of movement of the grinding wheel more accurately parabolic.

What I claim is:

1. In combination with a rotatable table adapted to carry a sheet of glass having a curved surface to be surfaced, a supporting frame over the table, a spindle mounted for rotation on the frame and substantially perpendicular to the surface of the glass means for rotating the spindle also carried by the frame, a surfacing device on the spindle, means for supporting the frame for oscillation on an axis inclined to the axis of rotation of the table and cutting such axis, and means whereby said last means may be adjusted to vary the angle of inclination of said axis of oscillation and whereby said axis may be adjusted bodily toward or from the table.

2. In combination with a table adapted to carry a sheet of glass having a curved surface, and mounted for rotation about a vertical axis, a frame over the table, a spindle mounted for rotation on the frame and directed toward the center of curvature of the glass sheet, a motor carried by the outer end of the frame, driving connections between the motor and spindle, a lap carried by the spindle, and means for supporting the frame for oscillation about a horizontal axis between the motor and spindle, and also oscillation about an axis inclined to the axis of rotation of the table and cutting such axis of rotation.

In testimony whereof, I have hereunto subscribed my name this 18th day of August, 1924.

GUSTAV EDWARD ERICSSON.